Oct. 16, 1923.
A. C. ANDERSEN ET AL
1,470,951
BOLT
Filed Dec. 14, 1921
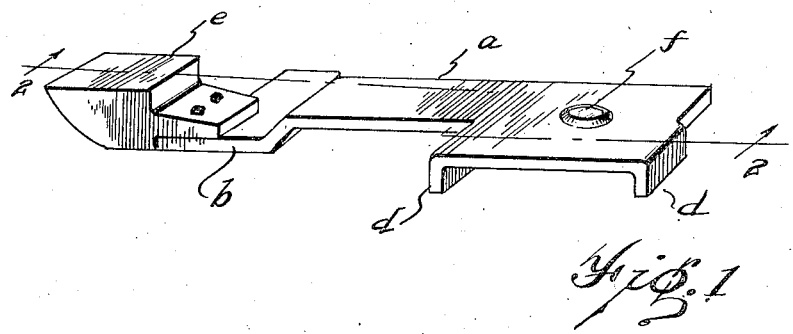
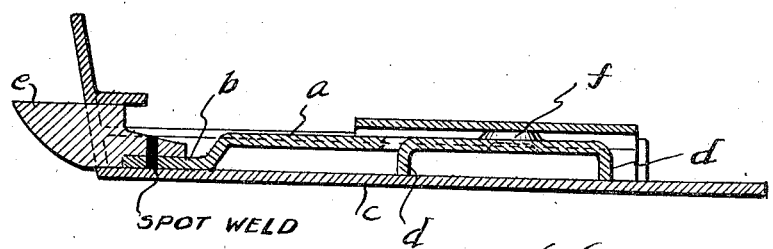

Patented Oct. 16, 1923.

1,470,951

UNITED STATES PATENT OFFICE.

ANDREW CHRISTIAN ANDERSEN, THOMAS PORTER ARCHER, AND PAUL WALDO SEILER, OF DETROIT, MICHIGAN, ASSIGNORS TO TERNSTEDT MANUFACTURING COMPANY, OF DETROIT, MICHIGAN, A CORPORATION OF MICHIGAN.

BOLT.

Application filed December 14, 1921. Serial No. 522,210.

*To all whom it may concern:*

Be it known that we, ANDREW CHRISTIAN ANDERSEN, THOMAS PORTER ARCHER, and PAUL WALDO SEILER, citizens of the United States, residing at Detroit, in the county of Wayne and State of Michigan, have invented certain new and useful Improvements in Bolts, of which the following is a specification.

This invention relates to sliding lock or latch bolts and is especially designed to afford a cheap bolt construction which will afford a suitable substitute for a cast metal bolt. Most bolts are castings and not only expensive but require considerable machining in order to make a suitable sliding bolt.

It is the object of the present invention to afford a bolt construction made from a stamping united with a piece of rolled metal to form the head of a bolt.

It is not broadly new to make an entire bolt of a stamping but the head constructions of such a bolt are of rather flimsy, unsatisfactory construction. By uniting the stamping and the rolled bolt head, we afford a relatively heavy solid head for the bolt and at the same time have a production article that may be very quickly and cheaply made and requires little or no machining.

In the drawings,—

Fig. 1 is a perspective of the bolt.

Fig. 2 is a longitudinal section of the same and the case in which it is guided.

This bolt is intended for use with a swinging lever retractor but the principle here involved may be used with any other form of retractor. Consequently we do not limit ourselves to a lever-actuated bolt. In the lever type of bolt which we have shown as an example of the invention, the body of the bolt is formed of a stamping *a* which has the forward part of the stamping turned down as at *b* to act as a guide on the front plate *c* of the lock casing. The rear and central portions of the body are bridged over the front plate and spaced therefrom by the turned-down runners *d* which serve as contact surfaces of minimum area to engage and run on the inside of the face plate, at the same time the rear one *d* forms an abutment to be engaged by the latch operating lever (not shown).

In the center of the space between the two runners we stamp up a spot *f* which has two valuable functions. It forms a contact portion of minimum size with the back plate to minimize the friction of the back plate in guiding the bolt. In the second place, it enables a portion of the bolt to bear tightly against the back plate to prevent rattling. If the bolt were made to fit along nearly its entire area tightly against the back case so as to slightly spring the back case, it would be impossible to move the bolt, so great would be the friction. On the other hand, if the bolt is made loose enough to permit the contact of almost the entire body portion, then the bolt will vibrate and rattle, hence this simple expedient of striking up a spot to tightly engage and slightly spring the back plate affords relatively small friction and at the same time affords a non-rattling bolt.

The front portion of the bolt body turns down as at *b*. This is adapted to set into a head or insert *e*. This is a solid rolled head. These heads are sawed from a solid metal bar of the cross sectional configuration shown by the bolt head and consequently this is a cheap production proposition. The bars may be rolled in a rolling mill to precisely the head configuration required, then they can be sawed off into short lengths to form separate bolt heads. These bolt heads are united to the body of the bolt by the two being set into a suitable jig and spot-welded together by applying two or three contacts of the spot-welder electrodes.

What we claim is:

1. A lock or latch bolt comprising a case provided with back and front plates, a sliding bolt provided with a head and a body portion, the latter guided at one side on one of the plates and having at the opposite side a spot arranged to engage with such plate and spring it slightly for the purpose of forming a minimum friction anti-rattle engagement of the bolt with its guide.

2. A lock or latch bolt comprising a case provided with a front and back plate, and a reciprocating bolt guided in the case provided with a head, and a stamped-out body portion having at one side turned-down runners for engaging one of the plates and on the other side a stamped out spot for engaging the head and springing the other plate out slightly and forming an anti-rattling engagement of the bolt with the case.

3. A lock, having in combination, a case for guiding a latch bolt, and a latch bolt guided therein and having a portion of the latch bolt bearing on the inside of the latch case at one side and a small bearing spot bearing on the inside of the latch case at the other side, the major portion of the latch bolt being removed from bearing relations with respect to said latch case.

4. A lock, having in combination, a case for housing and guiding a latch bolt, and said latch bolt provided with turned down runners for bearing on the inside of the case at one side and provided with a struck out bearing spot for bearing against the inside of the case at the other side, the major portion of the latch bolt being thereby removed from bearing relation with both sides of the inside of the case.

In testimony whereof we affix our signatures.

ANDREW CHRISTIAN ANDERSEN.
THOMAS PORTER ARCHER.
PAUL WALDO SEILER.